Oct. 11, 1932.                T. C. FREEBERG                1,882,415
                              DIRIGIBLE HEADLIGHT
                              Filed Oct. 24, 1931
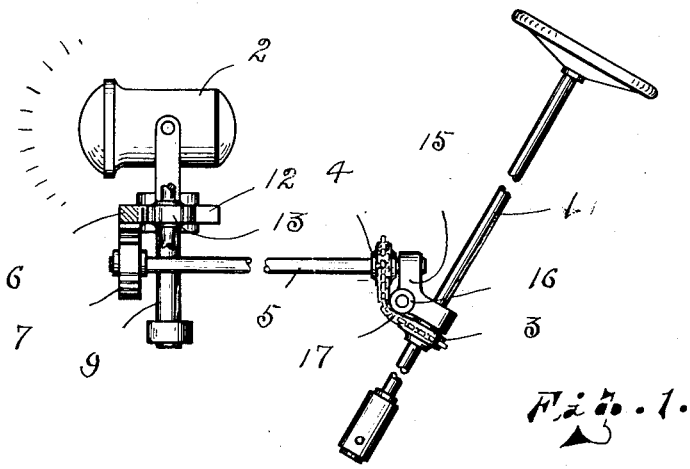
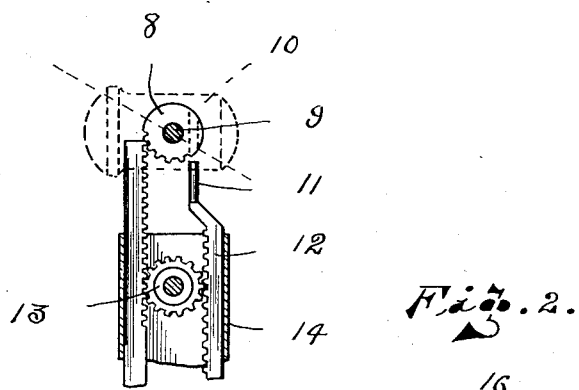
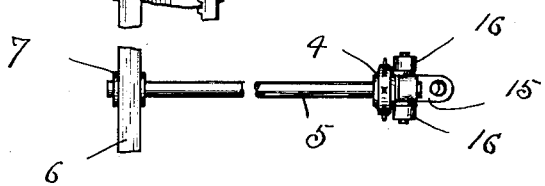
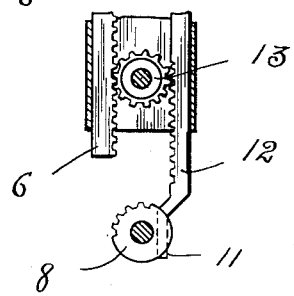
Inventor
Theodore C. Freeberg.
By
Leo Stevens.
Attorney Patented Oct. 11, 1932

1,882,415

UNITED STATES PATENT OFFICE

THEODORE C. FREEBERG, OF TWO HARBORS, MINNESOTA

DIRIGIBLE HEADLIGHT

Application filed October 24, 1931. Serial No. 570,886.

This invention relates to dirigible headlights, for automobiles, and has for its principal object to provide simple means whereby the near light is automatically adjusted upon the turning of the automobile.

Other objects and advantages of the invention will appear in the following description thereof.

In the accompanying drawing forming part of this application, and wherein like reference characters indicate like parts:

Figure 1 is a fragmental side elevation, partly in section, of the mechanism employed in operating the headlights: and Figure 2 is a fragmental contracted plan view of the instrumentalities employed.

1 represents the steering post of an automobile and 2 the right headlight of same. In carrying out the invention I propose to install a sprocket wheel 3 upon the steering post 1 in a suitable location to result in a similar wheel 4 mounted upon the horizontal shaft 5 bringing said latter shaft at the proper elevation in front of the radiator not shown of the automobile to actuate a reciprocable rack bar 6 transverse the chassis of the car. The outermost end of the shaft 5 carries the spur gear 7 which meshes with the under side of the rack and as the shaft 5 is rotated either one way or the other by the rotation of the steering stem 1 through the bevel gears 3 and 4, the rack bar 6 will be reciprocated back and forth.

This rack bar is sufficiently long to almost reach the central vertical axis of the headlight supports but falling somewhat short of such and is designed to have a central position without engagement with either. However the innermost vertical face of such bar at either end is cogged for alternate engagement with a mutilated gear wheel 8 fixed to the stem-like support 9 of each headlight. These mutilated, or partly geared wheels or hub-like structures 8, each carry through the rearmost half thereof a horizontally disposed hole indicated at 10 for the reception of either, simultaneously or alternately, the pintle-like ends 11 of the auxiliary rack bars 12.

The auxiliary rack bars are installed one adjacent, in the same plane with, and spaced from, the ends of the bar 6, and each engages a spur gear 13 mounted upon a vertical axle suitably fixed within the carrier bar 14 which may be of any desired construction and which spur gears mesh with the cogged vertical face of the ends of the bar 6, so that any movement of the latter bar longitudinally operates the auxiliary bars 12 in the opposite direction.

Respecting the installation of the sprocket wheels 3 and 4 upon the steering post 1 and shaft 5 I have illustrated as a convenient arrangement a bracket 15 one wing of which is mounted upon the steering post and the other wing acting as a bearing for the inner end of the shaft 5, said bracket carrying upon opposite sides thereof guiding rollers 16 over which the short sprocket chain 17, for engagement about the sprocket wheels 3 and 4, operates, so that the shaft 5 and steering post rotate in the same direction in unison.

From the above it is evident that rotation of the steering post for example towards the right will rotate the shaft 5 in the same direction, which will cause the rack 6 to extend also towards the right and thereby rotate the axial support of the right hand headlight so that it will turn in a like direction as indicated in dotted lines, Figure 2, thus augmenting the illumination towards the right of the car, simultaneously with extending the auxiliary pintle carrying bar 12 at the left outwardly so that just as the left end of the rack bar 6 leaves the hub 8 of the left headlight, the pintle 11 of the rack bar 12 will enter the hole 10 in the hub of the left light and thus hold it stationary in its directly forward illuminating position. Likewise when the steering post is in a position directing the wheels in a straight forwardly direction, neither end of the rack bar 6 will positively engage either lamp hub, and the pintles on the auxiliary bars will both be partly in position in the light supports, thus assuring their stationary parallel relation.

Having thus described my invention, what I claim and desire to secure by Letters Patent, is:

1. The combination with an automobile having headlights and steering post, of mechanism for dirigibly operating the headlights, comprising a shaft operable directly from and in the same direction as the post and means including a horizontal reciprocable rack bar and a gear having an opening therein connected with each headlight for alternate engagement with the rack bar, and means engageable with said openings whereby when one light is being operated the other is held stationary.

2. Mechanism for operating dirigible headlights including a shaft carrying a spur gear upon one end thereof, a longitudinally reciprocable rack in constant engagment with said gear, a gear having an opening therein connected with each headlight for turning same, said gears being alternately operable by the rack, a counter gear at either end of the rack and in constant engagement therewith, and a counter rack in constant engagement with each counter gear, said counter racks having holding means engageable with said gear openings for holding both lights in parallelism or alternately in angular relation to each other.

3. The combination with a dirigible headlight, of a hub-like portion carrying a gear provided with an opening, a longitudinally reciprocal rack for operating the gear in turning the light, a second gear also operated by the rack and a counter rack operated by the last mentioned gear and carrying holdfast means for engagement with said opening when the latter is not being operated by the first mentioned rack.

In testimony whereof I affix my signature.

THEODORE C. FREEBERG.